Figure 1:
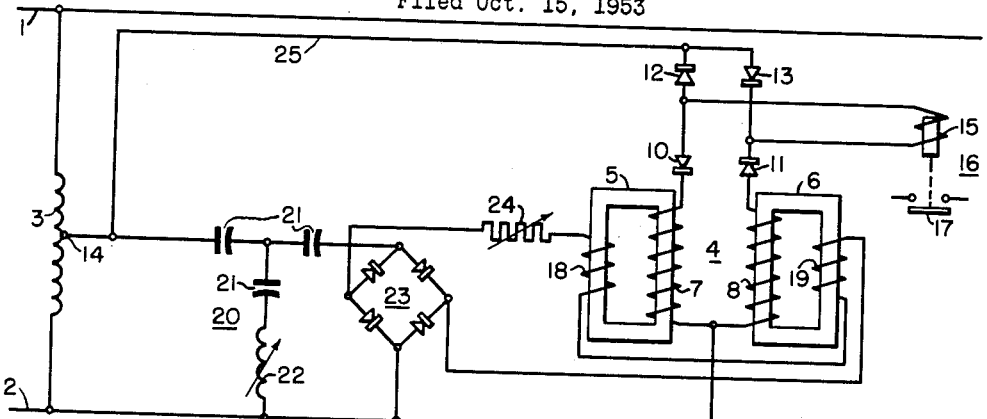

July 31, 1956      N. F. SCHUH, JR      2,757,320

FREQUENCY SENSITIVE CONTROL DEVICE

Filed Oct. 15, 1953

WITNESSES:
Robert C. Baird
Leon M. Garman

INVENTOR
Niles F. Schuh, Jr.
BY F. P. Lyle
ATTORNEY

United States Patent Office 2,757,320
Patented July 31, 1956

2,757,320
FREQUENCY SENSITIVE CONTROL DEVICE

Niles F. Schuh, Jr., Lima, Ohio, assignor to Westinghouse Electric Corporation, East Pittsburgh, Pa., a corporation of Pennsylvania Application October 15, 1953, Serial No. 386,317

6 Claims. (Cl. 317—138)

The present invention relates to frequency sensitive control devices and, more particularly, to a control device for actuating relay contacts in response to change in frequency of an alternating current circuit above or below a predetermined value.

The invention provides a reliable and very accurate control device that responds to change in frequency of an alternating current circuit to actuate a relay contact, or contacts, to effect a desired operation or to provide an indication when the frequency of the alternating current circuit falls below, or rises above, a predetermined value.

While the usefulness of this device is obviously not restricted to any specific application, it is especially useful in alternating current aircraft electrical systems. Variable-frequency alternating current systems are often used on aircraft to supply loads which are not sensitive to frequency, such as heating and lighting loads. Some components which may be utilized in such systems may be damaged at low frequencies, however, or may not operate properly at low frequencies, and it is necessary to provide means for removing these components from the system when the frequency falls below a predetermined value, so that a frequency sensitive control device is needed. Under-frequency protection is also frequently desirable in constant-frequency systems, since the loads supplied by such systems are designed for constant-frequency operation and may be damaged by low frequency. If only a single generator is operating in a constant-frequency system normally supplied by two or more parallelled generators, the frequency may vary and some elements of the system and some loads may be damaged by low frequency so that it is desirable to provide means for indicating such a condition, or for removing from the system the components which are subject to damage.

The principal object of the present invention is to provide a frequency sensitive control device which responds accurately to change in frequency of an alternating current system, and which is highly reliable and is not affected by mechanical shock or vibration, so that it is suitable for aircraft use.

Another object of the invention is to provide a frequency sensitive control device which can be made quite sensitive and accurate, but which consists only of relatively rugged static devices and relatively insensitive relays, so that it is very reliable and is capable of withstanding shock and vibration.

A further object of the invention is to provide a frequency sensitive control device which will respond accurately at a predetermined frequency without being affected by variation in the supply voltage, and which will not give a false indication of low frequency in case of failure of a relay or a failure in any of the leads to the device.

More specifically, the invention provides a control device utilizing a saturable reactor device such as a magnetic amplifier, preferably of the self-saturating type, which controls the energization of a relay, together with frequency responsive means for controlling the current in a control winding on the reactor in such a manner as to prevent energization of the relay when the frequency is above a predetermined value and to permit energization of the relay when the frequency falls below this value.

Figure 2:
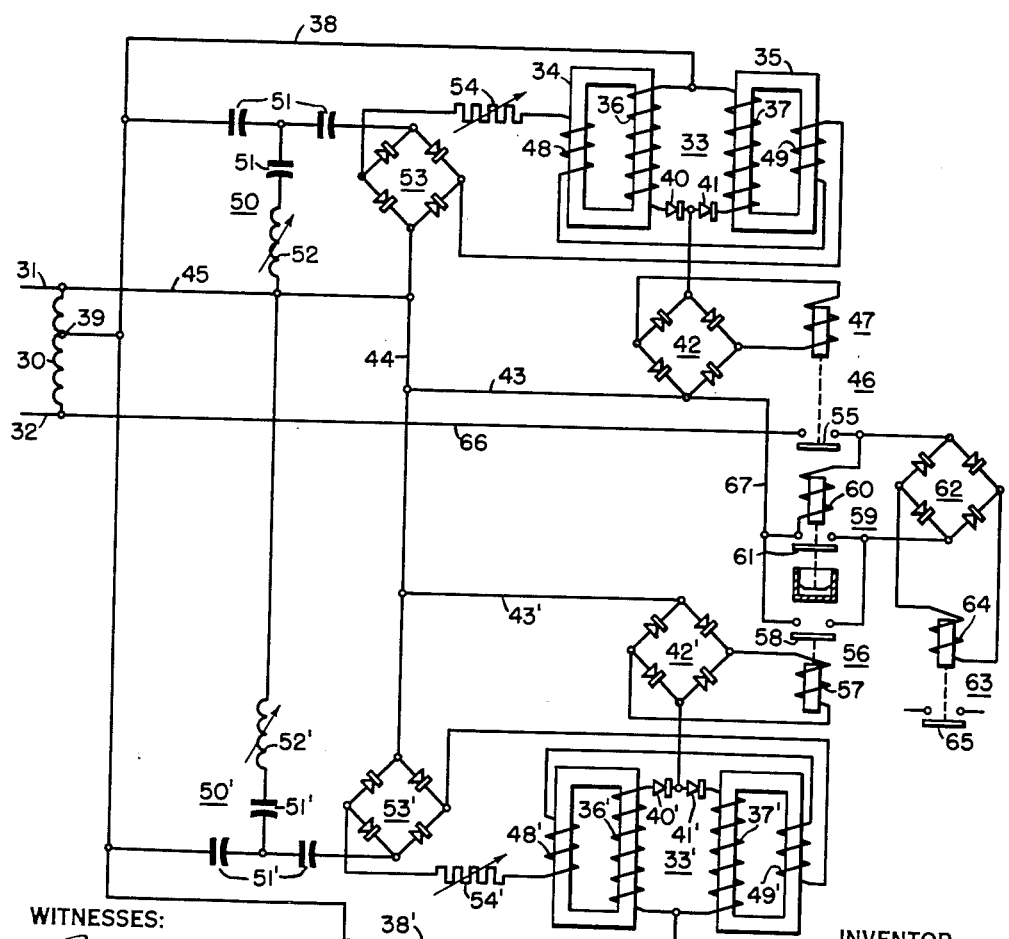

Other objects and advantages of the invention will be apparent from the following detailed description, taken in connection with the accompanying drawing, in which:

Figure 1 is a schematic diagram showing an illustrative embodiment of the invention; and Fig. 2 is a similar diagram showing a more elaborate embodiment of the invention.

The invention is shown in Fig. 1 embodied in a control device for responding to change in frequency of an alternating current circuit, indicated by the lines 1 and 2. An autotransformer 3 is preferably connected across the lines 1 and 2 to step down the voltage in order to reduce the necessary size of the components of the control device. The control device includes a saturable reactor device which is shown as a magnetic amplifier 4 of the self-saturating type. The magnetic amplifier 4 has a magnetizable core structure, which is shown as consisting of core members 5 and 6, and has main windings 7 and 8 disposed on the core members 5 and 6, respectively. The main windings 7 and 8 are both connected at one end to the line 2 by a conductor 9, and at the other end they are connected to rectifiers 10 and 11, respectively, to provide the desired self-saturating characteristic. Rectifiers 12 and 13 are connected to the rectifiers 10 and 11, and to a tap 14 on the autotransformer 3, in a full-wave bridge circuit to provide a direct current output, and the operating coil 15 of a relay 16 is connected to the direct current output of the rectifier bridge, so that the relay operates to actuate its contacts 17 in response to the current in the windings 7 and 8.

The magneic amplifier 4 also has control windings 18 and 19 which are connected in series and energized in accordance with the frequency of the circuit 1, 2. For this purpose, a filter circuit 20 is connected across the line 2 and the autotransformer tap 14. The filter circuit 20 consists of capacitors 21 and a variable inductance 22 connected together in any suitable manner to provide a high pass filter, that is, the filter circuit is designed to permit current flow at all frequencies above a predetermined value, and to greatly attenuate, or substantially prevent, current flow at frequencies below that value. The inductance 22 is preferably made adjustable so that the cut-off frequency of the filter may be adjusted. A single-phase rectifier bridge 23 is connected to the filter circuit 20 to rectify the output current of the filter, and the direct current terminals of the rectifier bridge 23 are connected to the control windings 18 and 19. An adjustable resistance 24 is preferably connected in series with the control windings to permit adjustment of the control current.

In operation, the main windings 7 and 8 of the magnetic amplifier 4 are continuously energized from the autotransformer 3. Thus, on alternate half-cycles of the alternating current supply, current will flow from the autotransformer through the conductor 25, rectifier 13, relay coil 15, rectifier 10, main winding 7 and conductor 9 to the line 2. On the successive half-cycles, current will flow from the line 2 through the conductor 9, main winding 8, rectifier 11, relay coil 15, rectifier 12 and conductor 25 to the autotransformer 3. Thus, the main windings 7 and 8 are continuously energized and, because of the self-saturating characteristic, tend to maintain the core members 5 and 6 saturated.

As long as the frequency of the circuit 1, 2 is above the predetermined value for which the filter circuit 20 is tuned, however, a substantial control current will flow through the windings 18 and 19 from the filter circuit 20 and rectifier bridge 23. The windings 18 and 19 are arranged and connected to oppose the magnetizing effect of the windings 7 and 8, and as long as a substantial control current flows, therefore, the core members 5 and 6 are kept unsaturated and the windings 7 and 8 have high impedance. Under these conditions, no appreciable current flows through the relay coil 15, or at least only a very small current which is insufficient to actuate the relay, and the relay 16 remains in its unactuated position. If the frequency of the circuit 1, 2 falls below the predetermined value, the filter circuit 20 substantially cuts off the flow of current in the control windings 18 and 19, and the core members 5 and 6 become saturated, so that the impedance of the windings 7 and 8 is greatly reduced. The current flowing through the relay coil 15 is then sharply increased and causes the relay to operate and actuate its contacts 17.

It will be understood that the relay 16 may be of any suitable type and if desired may be provided with a time delay to prevent operation on transient conditions. The relay may, of course, have any number of contacts, either normally open or normally closed, which may be arranged in any desired manner to effect the desired operations if the frequency drops below the predetermined value. Thus, the relay 16 may be utilized to trip a circuit breaker or contactor in case of under-frequency, or to give a signal or indication of this condition, or it may be used to effect closing of circuit breakers or contactors when the frequency rises above the predetermined value.

It will be evident that a frequency sensitive control device has been provided which can be made very sensitive and accurate, and which can be adjusted to have a very small difference between the pick-up and drop-out frequencies. The device consists entirely of rugged static components, which are highly reliable and not adversely affected by shock or vibration, together with a relay which may be quite insensitive, since it is required only to respond to a relatively large change in current, and can therefore be quite rugged. Thus, the device is highly reliable and is very suitable for aircraft use. The operating frequency is not affected by variation in the supply voltage, since the magnetic amplifier can readily be designed so that its magnetic characteristics change with applied voltage in a manner to compensate for variations in the control winding current due to voltage variations. It is also to be noted that false indication of under-frequency cannot occur in case of failure of any of the leads to the device, since such failure will result in the relay 16 remaining deenergized, and similarly any mechanical failure in the relay itself does not cause false indication since it is normally deenergized when the frequency is above the desired value.

In many instances, it may be desirable to obtain operation of the relay only after a suitable time delay when the frequency drops slightly below the desired value, in order to prevent operation on transient conditions, but to obtain substantially instantaneous operation when the frequency drops to materially lower values, in order to prevent damage to equipment connected to the system. This is often the case in aircraft systems, as when the alternating current generator or generators supplying the system are driven by turbines, because of the rapid decline in frequency that may occur under some conditions.

An embodiment of the invention which provides this type of operation is shown in Fig. 2. In this embodiment, as before, the control device is supplied from an autotransformer 30 connected to the system by lines 31 and 32. In this embodiment of the invention, two frequency sensitive channels are provided, each being substantially similar to the circuit of Fig. 1. Thus, one channel may include a magnetic amplifier 33 having magnetic core members 34 and 35 with main windings 36 and 37. The main windings 36 and 37 are both connected at one end by a conductor 38 to a tap 39 on the autotransformer 30. Rectifiers 40 and 41 are connected to the other ends of the main windings to provide the desired self-saturating characteristic. The rectifiers 40 and 41 are connected to the line 31 through a full-wave rectifier bridge 42 and conductors 43, 44 and 45. A pilot relay 46 has its operating coil 47 connected to the direct current output terminals of the rectifier bridge 42, so that the relay 46 will be energized in response to the current of the windings 36 and 37.

The magnetic amplifier 33 also has control windings 48 and 49 connected in series and energized in accordance with the frequency of the system. This energization is provided by a high pass filter circuit 50 consisting of capacitors 51 and an adjustable inductance 52 connected in a filter circuit which will pass current at frequencies above a predetermined value but will substantially prevent current flow at frequencies below that value. The filter circuit 50 is connected across the line 31 and the transformer tap 39, and a full-wave rectifier bridge 53 is connected across the output of the filter circuit 50. The direct current terminals of the rectifier bridge 53 are connected to the control windings 48 and 49 in series with an adjustable resistance 54.

It will be evident that the operation of this circuit is essentially the same as that described above in connection with Fig. 1. Thus, the main windings 36 and 37 of the magnetic amplifier 33 are continuously energized, the current flowing on alternate half-cycles from the autotransformer tap 39 through conductor 38, winding 36, rectifier 40, rectifier bridge 42 and relay coil 47, and conductors 43, 44 and 45 to the line 31, and on the successive half-cycles from the line 31 through conductors 45, 44 and 43, rectifier bridge 42 and relay coil 47, rectifier 41, winding 37 and conductor 38 to the autotransformer. The control windings 48 and 49, as before, are disposed and connected to oppose the magnetizing effect of the main windings, and when the frequency is above the value for which the filter circuit 50 is tuned, control current flows in the windings 48 and 49 and keeps the magnetic amplifier substantially unsaturated, so that the impedance of the main windings is high and no appreciable current flows. Thus, the relay 46 remains unactuated. At frequencies below this value, the control current is substantially cut off by the filter circuit and the impedance of the windings 36 and 37 is sharply decreased so that the current increases and causes the relay 46 to actuate its contact 55.

A second frequency sensitive channel is also provided and is preferably connected to the autotransformer 30 in parallel with the circuit just described. This second channel may be identical to the first channel and consists of similar components, which are identified on the drawing by primed reference characters corresponding to those of the circuit just described. The operation of this second channel is identical to that of the first, except that the filter circuit 50′ is tuned to a substantially lower frequency than the filter circuit 50. Thus, for example, in the case of an aircraft electrical system, the filter circuit 50 may be tuned to a frequency slightly below the normal system frequency, while the filter circuit 50′ may be tuned to a frequency equal to approximately 80% of the normal frequency. The output current of the magnetic amplifier 33′ is used to energize a second pilot relay 56 which has its operating coil 57 connected to the direct current terminals of the rectifier bridge 42′. It will be evident that when the frequency falls to the value for which the filter circuit 50′ is tuned the pilot relay 56 will be energized to close its contact 58.

As indicated above, it is desired to obtained operation after a predetermined time delay if the frequency falls to the value for which the first channel is adjusted, and to obtain substantially instantaneous operation if the frequency falls to the lower value for which the second channel is adjusted. For this purpose, a time delay relay 59 is provided which may be any suitable type of relay which operates at a predetermined time after its coil 60 is energized. The relay 59 has contacts 61 which are connected in parallel with the contacts 58 of the second pilot relay 56 to a full-wave rectifier bridge 62. A main relay 63 is provided having its operating coil 64 connected to the direct current terminals of the rectifier bridge 62. The contacts 65 of the relay 63 may be arranged in any desired manner, as previously described in connection with the relay 16, depending on the purpose for which the device is to be used.

In operation, the two frequency sensitive channels each function in the manner described, so that when the frequency is above the value for which the filter circuit 50 is adjusted, both pilot relays 46 and 56 are deenergized, since no appreciable current flows in the main windings of either of the magnetic amplifiers. If the frequency falls to a value below the value for which the first channel is adjusted, but above the value for which the second channel is adjusted, the pilot relay 46 is energized and closes its contact 55. This completes a circuit from the line 32 through conductor 66, the relay contact 55, coil 60 of the time delay relay 59, and conductors 67, 43, 44 and 45 to the line 31. The time delay relay 59 is thus energized and after a predetermined time closes its contacts 61, completing a circuit from the line 32 through conductor 66, relay contact 55, rectifier bridge 62, relay contact 61 and conductors 67, 43, 44 and 45 to the line 31. The main relay 63 is thus energized and its contact 65 actuated. If the frequency falls below the lower value for which the second channel is adjusted, the second pilot relay 56 is also energized and closes its contact 58. This contact is connected, as shown, across the contacts of the time delay relay 59, so that the energizing circuit for the coil 64 of the main relay 63 is completed immediately upon closure of the two pilot relays and instantaneous operation of the relay 63 is obtained if the frequency drops to the lower value.

It should now be apparent that a frequency sensitive control device has been provided which is especially suitable for aircraft use, because of its ruggedness and reliability, together with the high accuracy which can be obtained. Certain preferred embodiments of the invention have been shown and described for the purpose of illustration, but it will be apparent that various other embodiments and modifications are possible within the scope of the invention, and it is to be understood that the invention is not limited to the specific arrangements shown, but in its broadest aspects it includes all equivalent embodiments and modifications.

I claim as my invention:

1. A control device comprising first and second magnetic amplifiers, each of said magnetic amplifiers having a main winding and a control winding, means for energizing said windings from an alternating current voltage, the energizing means for the control windings including frequency responsive means for supplying direct current to the control winding of the first magnetic amplifier when the frequency of said voltage is above a predetermined value and for supplying direct current to the control winding of the second magnetic amplifier when the frequency is above a lower predetermined value, the frequency responsive means substantially preventing flow of current to the respective control windings when the frequency is below said values, a relay, means responsive to current flow in the main winding of the first magnetic amplifier for effecting operation of said relay after a predetermined time delay, and means responsive to current flow in the main winding of the second magnetic amplifier for effecting substantially instantaneous operation of the relay.

2. A control device comprising first and second magnetic amplifiers, each of said magnetic amplifiers having a main winding and a control winding, means for energizing said windings from an alternating current voltage, the energizing means for the control windings including frequency responsive means for supplying direct current to the control winding of the first magnetic amplifier when the frequency of said voltage is above a predetermined value and for supplying direct current to the control winding of the second magnetic amplifier when the frequency is above a lower predetermined value, the frequency responsive means substantially preventing flow of current to the respective control windings when the frequency is below said values, a first pilot relay responsive to current flow in the main winding of the first magnetic amplifier, time delay means actuated by operation of said first pilot relay, a main relay, said time delay means being connected to effect operation of the main relay a predetermined time after actuation of the time delay relay, a second pilot relay responsive to current flow in the main winding of the second magnetic amplifier, and means for effecting substantially instantaneous operation of the main relay upon operation of the second pilot relay.

3. A control device comprising first and second magnetic amplifiers, each of said magnetic amplifiers having a main winding and a control winding, means for energizing said main windings from an alternating current voltage, first frequency responsive means adapted to supply direct current to the control winding of the first magnetic amplifier when the frequency of said voltage is above a predetermined value and to substantially prevent current flow when the frequency is below said value, second frequency responsive means adapted to supply direct current to the control winding of the second magnetic amplifier when said frequency is above a lower predetermined value and to substantially prevent current flow when the frequency is below said lower value, a relay, means responsive to current flow in the main winding of the first magnetic amplifier for effecting operation of said relay after a predetermined time delay, and means responsive to current flow in the main winding of the second magnetic amplifier for effecting substantially instantaneous operation of the relay.

4. A control device comprising first and second magnetic amplifiers, each of said magnetic amplifiers having a main winding and a control winding, means for energizing said main windings from an alternating current voltage, first frequency responsive means adapted to supply direct current to the control winding of the first magnetic amplifier when the frequency of said voltage is above a predetermined value and to substantially prevent currenet flow when the frequency is below said value, second frequency responsive means adapted to supply direct current to the control winding of the second magnetic amplifier when said frequency is above a lower predetermined value and to substantially prevent current flow when the frequency is below said lower value, a first pilot relay responsive to current flow in the main winding of the first magnetic amplifier, time delay means actuated by operation of said first pilot relay, a main relay, said time delay means being connected to effect operation of the main relay a predetermined time after actuation of the time delay relay, a second pilot relay responsive to current flow in the main winding of the second magnetic amplifier, and means for effecting substantially instantaneous operation of the main relay upon operation of the second pilot relay.

5. A control device comprising first and second magnetic amplifiers, each of said magnetic amplifiers having a main winding and a control winding, means for energizing said main windings from an alternating current voltage, a first filter circuit connected to said voltage and adapted to permit current flow when the frequency of the voltage is above a predetermined value and to substantially prevent current flow when the frequency is below said value, a rectifier connected to the filter circuit, means for connecting the control winding of the first magnetic amplifier to be energized by direct current from said rectifier, a second filter circuit connected to said voltage and adapted to permit current flow when the frequency of the voltage is above a lower predetermined value and to substantially prevent current flow when the frequency is below said lower value, a rectifier connected to the second filter circuit, means for connecting the control winding of the second magnetic amplifier to be energized by direct current from the last-mentioned rectifier, a relay, means responsive to current flow in the main winding of the first magnetic amplifier for effecting operation of said relay after a predetermined time delay, and means responsive to current flow in the main winding of the second magnetic amplifier for effecting substantially instantaneous operation of the relay.

6. A control device comprising first and second magnetic amplifiers, each of said magnetic amplifiers having a main winding and a control winding, means for energizing said main windings from an alternating current voltage, a first filter circuit connected to said voltage and adapted to permit current flow when the frequency of the voltage is above a predetermined value and to substantially prevent current flow when the frequency is below said value, a rectifier connected to the filter circuit, means for connecting the control winding of the first magnetic amplifier to be energized by direct current from said rectifier, a second filter circuit connected to said voltage and adapted to permit current flow when the frequency of the voltage is above a lower predetermined value and to substantially prevent current flow when the frequency is below said lower value, a rectifier connected to the second filter circuit, means for connecting the control winding of the second magnetic amplifier to be energized by direct current from the last-mentioned rectifier, a first pilot relay responsive to current flow in the main winding of the first magnetic amplifier, time delay means actuated by operation of said first pilot relay, a main relay, said time delay means being connected to effect operation of the main relay a predetermined time after actuation of the time delay relay, a second pilot relay responsive to current flow in the main winding of the second magnetic amplifier, and means for effecting substantially instantaneous operation of the main relay upon operation of the second pilot relay.

References Cited in the file of this patent

UNITED STATES PATENTS

| | | |
|---|---|---|
| 1,914,220 | Sorensen | June 13, 1933 |
| 1,940,335 | Suits | Dec. 19, 1933 |
| 2,021,754 | Suits | Nov. 19, 1935 |
| 2,513,342 | Marshall | July 4, 1950 |
| 2,518,865 | Carotto | Aug. 15, 1950 |
| 2,542,638 | Desch | Feb. 20, 1951 |
| 2,610,315 | McKendry | Sept. 9, 1952 |
| 2,677,800 | Phillips | May 4, 1954 |
| 2,682,633 | Woerdemann | June 29, 1954 |

FOREIGN PATENTS

| | | |
|---|---|---|
| 822,783 | France | Sept. 27, 1937 |